UNITED STATES PATENT OFFICE.

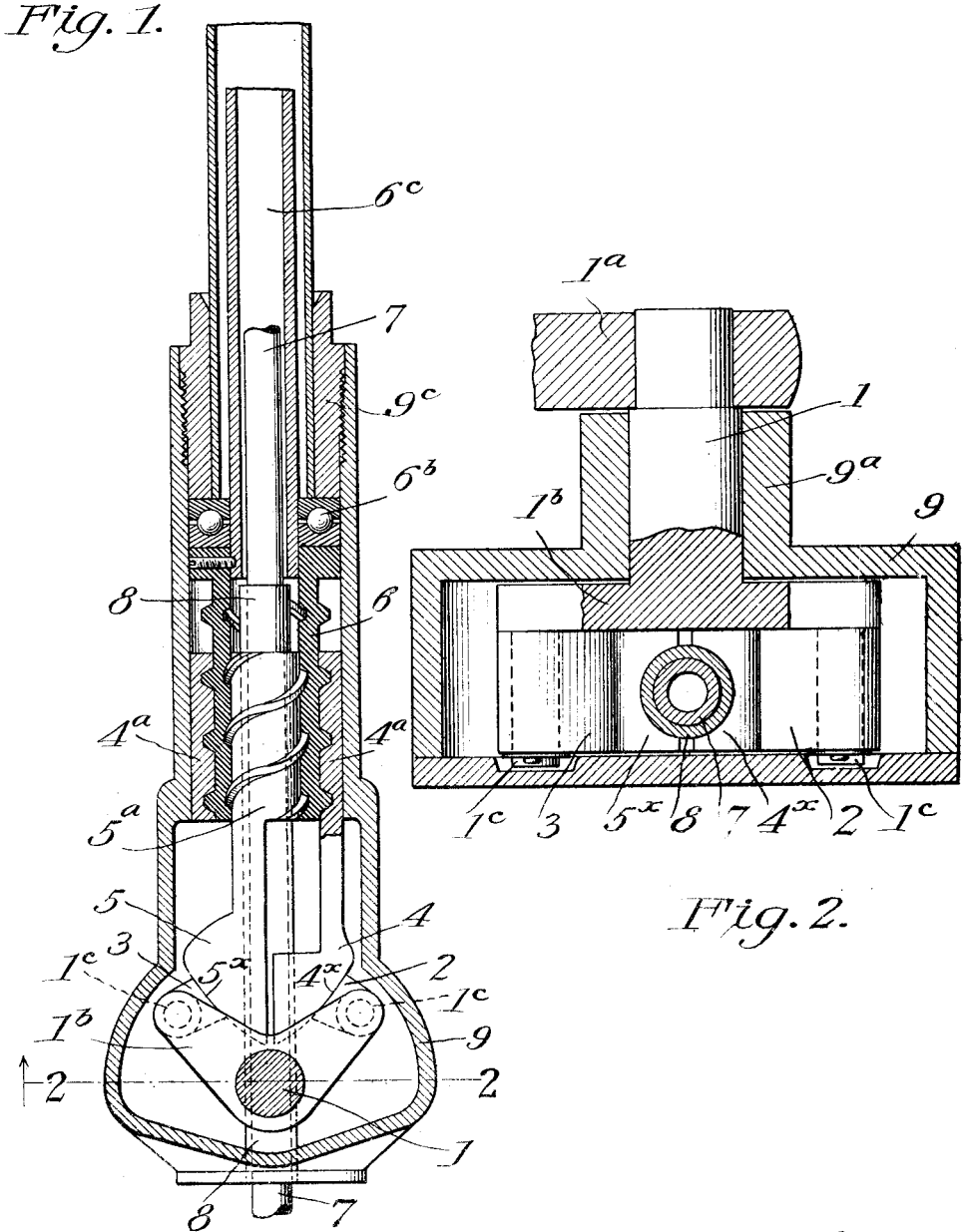

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING-GEAR.

1,192,462.  Specification of Letters Patent.  Patented July 25, 1916.

Application filed May 5, 1913, Serial No. 765,654. Renewed June 19, 1916. Serial No. 104,578.

*To all whom it may concern:*

Be it known that I, DAVID E. Ross, of La Fayette, in the county of Tippecanoe and State of Indiana, have invented certain new and useful Improvements in Steering-Gear; and I hereby declare that the following is a full, clear, and exact description thereof, reference being had to the accompanying drawings, which form part of this specification.

This invention is a novel improvement in steering gears, and its object is to construct a simple and economical steering-gear which can be easily operated and will securely hold the steering crank in any position to which it is adjusted by the steering shaft and will prevent any casual reversal of motion by back pressure on the steering crank.

I will explain the invention fully with reference to the accompanying drawings, in which—

Figure 1 is a vertical section through a steering gear embodying the invention. Fig. 2 is an enlarged section on line 2—2, Fig. 1, looking upward.

1 designates a rocker-shaft which is journaled in a lateral extension $9^a$ of a casing or housing 9; which may be made of any suitable construction. To the outer end of the rocker-shaft 1 may be attached the steering crank, or ball arm, $1^a$ of ordinary construction; said steering crank in practice being suitably mediately connected (by means not shown) with the vehicle steering wheels. On the inner end of the rocker-shaft 1 is fixed a double armed lever $1^b$, on the opposite arms of which, at points preferably equidistant from the axis of the shaft 1, are pivoted shoes 2 and 3; said shoes may be pivotally mounted on studs $1^c$ on the arms of the lever $1^b$, and secured thereon by washers and pins as indicated in Fig. 2, or in any other suitable manner.

The shoe 2 is adapted to engage a cam member 4 which has a preferably curved cam face $4^x$ opposed to and engaging the relatively curved face of the shoe 2. The shoe 3 is adapted to engage a cam member 5 which has a preferably curved cam surface $5^x$ engaging the relatively curved face of the shoe 3. The cam surfaces $4^x$, $5^x$ are similar but oppositely inclined, and are so formed that if the two cam members be moved simultaneously in opposite directions, the lever $1^b$ will be rocked but the shoes 2 and 3 will always remain in close contact with their respective cam surfaces $4^x$ and $5^x$. The shaft 1 will be rocked to right or left according to the movement of the cam members 4 and 5; but in any and all positions of said cam members 4 and 5, the shaft 1 will be locked by the engagement of said cams and shoes.

As shown the cam 4 has an internally threaded shank portion $4^a$ engaging external threads on a worm sleeve-member 6 rotatably mounted in the casing 9. The cam 5 has a cylindric shank $5^a$ which is externally threaded and engages internal threads in the worm sleeve member 6. This sleeve member 6 has an end thrust bearing against ball bearings $6^b$ secured within the casing by a plug $9^c$. A hollow steering post $6^c$ may be keyed, or otherwise rigidly connected, at its inner end to the worm sleeve member 6, as indicated in the drawings, so that said member may be rotated by the usual steering wheel, not shown, on the outer end of the post $6^c$. A guide tube 8 may be attached to the casing 9 and extends between the cams 4 and 5 and through the hollow shank $5^a$ of cam 5 as shown. The control rod or tube 7 may extend through the hollow steering post and worm member and guide tube 8 between the cams as indicated in Figs. 1 and 2, so that the steering gear will not interfere with the operation of the controls. The cam members 4 and 5 are recessed on their adjacent opposed faces to fit the guide tube 8 which serves as an inner brace or support for the said cams and relieves their shanks of lateral strain.

It will be seen from the drawing that when the steering post $6^c$ is turned the worm sleeve member 6 will also be turned and the cams 4 and 5 will be thereby moved in opposite directions longitudinally of the casing, with the effect on the rocker-shaft 1 above described.

The curvature of the faces of the shoes 2 and 3 and their opposed cam surfaces $4^x$, $5^x$ are such that the shoes always remain in contact with the cam surfaces; and as the cams 4 and 5 travel in opposite directions the shoes 2 and 3 are kept in close contact with their respective cam surfaces, and the shaft 1 is rocked. I preferably locate the shoes equidistant from the axis of shaft 1 and make the cams 4 and 5 move equally and simultaneously in opposite directions; and in such case, as will be obvious, when the worm sleeve member 6 is rotated, the cam members 4 and 5 will be moved equally in opposite directions with great force, and will—through the cam surfaces 4ˣ, 5ˣ and shoes 2 and 3—rock the shaft 1; and such shaft will be held securely in whatever position adjusted by the cams by reason of the continual engagement of said cam surfaces with the said shoes; such cam surfaces and shoes preventing any casual reverse movement of the rocker-shaft by pressure applied to the said shaft through the steering crank 1ᵃ.

It will be seen that in this construction the cams and their respective shoes move in the same directions; that is when cam 4 (or 5) moves downward its related shoe 2, (or 3) moves downward also.

What I claim is:

1. In a steering gear, the combination of a rocker-shaft, opposite arms thereon, shoes pivoted on said arms, cams having surfaces slidably and frictionally engaging said shoes to resist wear and at the same time prevent casual slip, and means for simultaneously moving the cams in such manner that the shaft is rocked while the shoes remain in frictional contact with the opposed cams, each cam and its relative shoe moving in the same direction.

2. In a steering gear, the combination of a rocker-shaft, opposite shoes pivotally connected therewith at equidistant points therefrom, opposite cams frictionally engaging the respective shoes to resist wear and at the same time prevent casual slip, means for shifting said cams simultaneously and equally in opposite directions, and an intermediate brace and guide for said cams with which they have sliding contact, each cam and its related shoe moving in the same direction.

3. In a steering gear, the combination of a rocker-shaft, opposite arms connected therewith, shoes pivotally connected with said arms and equidistant from the shaft, oppositely facing longitudinally movable cams having surfaces slidably and frictionally engaging said shoes to resist wear and at the same time prevent casual slip, each cam and its related shoe moving in the same direction, each cam member having a worm threaded portion on its shank; with a rotatable worm member engaging the threaded portions of the shanks of the cam members, and means for operating the rotatable worm member.

4. The combination of a rocker-shaft, opposite arms connected therewith, shoes pivotally connected with said arms and equidistant therefrom, oppositely movable cams frictionally engaging the shoes, an internally threaded worm member connected with one cam, an externally threaded worm member connected with the other cam, fixed means for guiding the cams interposed therebetween, a rotatable externally and internally threaded worm sleeve member engaging the worm sleeve members of the cams, and means for operating the worm sleeve member, substantially as described.

5. In a steering gear, the combination of a rocker-shaft, a double armed lever on said shaft, shoes pivotally connected to the arms of said lever at points equidistant from the shaft, oppositely movable and oppositely inclined cams frictionally engaging said shoes, and adapted to effect the rocking of the shaft and the locking thereof in adjusted position, each cam and its related shoe moving in the same direction, one cam having an external worm threaded portion on its shank, and the other cam having an internally worm threaded portion on its shank; a fixed bar extending between the cams to guide them in their movements, a rotatable worm sleeve engaging the worm threaded portion of both the cams, and a steering post for operating said rotatable worm sleeve.

In testimony that I claim the foregoing as my own, I affix my signature in presence of two witnesses.

DAVID E. ROSS.

Witnesses:
H. L. TEMPLE,
H. E. WARD.